2,891,039

TERPOLYMERS OF DIOLEFINS WITH HALF-ESTERS OF MALEIC ACID AND A MONO-OLEFINIC MONOMER

Günter Kolb and Wilhelm Becker, Koln-Stammheim, Germany, assignors to Farbenfabriken Bayer Aktiengesellschaft, Leverkusen, Germany, a corporation of Germany No Drawing. Application June 1, 1955
Serial No. 512,557

Claims priority, application Germany June 5, 1954

8 Claims. (Cl. 260—78.5)

This invention relates to a process for the production of synthetic elastomers.

It has already been proposed in British specification 360,822 to prepare copolymers of butadiene with unsaturated acids, such as acrylic acid or methacrylic acid. A certain retardation of the polymerization is caused by the addition of these unsaturated acids. The synthetic elastomeric copolymers which are obtained show high defo values (Bader, Kautschuk 14 (1953), page 223), can be worked up only with difficulty and produce vculcanizates with reduced technological properties.

It has now been found that the polymerization proceeds rapidly and excellent workable synthetic elastomers are obtained if butadiene or a homologue or derivative thereof such as 2-methylbutadiene, 2.3-dimethylbutadiene, 2-chlorbutadiene is subjected to copolymerization in aqueous emulsion, preferably at a pH of less than 7, in the presence of an ester acid of an unsaturated polybasic carboxylic acid, if desired in the presence of further polymerizable organic compounds containing olefinic double bonds. By the expression "ester acids of unsaturated polybasic acids" there are to be understood those compounds in which at least one carboxyl group is esterified and at least one further carboxyl group is unreacted. Examples of unsaturated polybasic acids are maleic acid, substituted maleic acids, such as α-chloromaleic acid, α-methylmaleic acid, fumaric acid and citroconic acid. Practically all compounds containing hydroxyl groups can be considered as alcohol components, but aliphatic saturated and unsaturated alcohols with 4–18 carbon atoms, such as, for example, butyl alcohol, octyl alcohol, dodecyl alcohol or allyl alcohol, have proved to be particularly suitable. Further hydroxy compounds are for instance aromatic hydroxy compounds such as phenol, p-chlorphenol, cresol, α-naphthol, araliphatic hydroxy compounds such as benzyl alcohol, phenylethyl alcohol, cycloaliphatic alcohols, such as cyclohexanol. Examples of further polymerizable organic compounds which can be present during the copolymerization are styrene, a styrene substituted in the aromatic nucleus by halogen atoms, alkyl or other organic residues, acrylonitrile, and esters of acrylic and methacrylic acid with aliphatic, cycloaliphatic and araliphatic alcohols as well as with aromatic hydroxy compounds such as the methyl-, ethyl-, butyl-, alkyl-, dodecyl-, stearyl-, cyclohexyl-, phenyl-, benzyl-esters of the aforementioned acids.

The emulsion polymerization is carried out in aqueous medium, and it is advantageous for the pH value to be kept lower than 7. The compounds known in connection with emulsion polymerization can be used as emulsifiers. In particular, the alkali metal salts of paraffin sulphonates obtained by sulphochlorination of long-chain paraffins and subsequent saponification of the product (German specification No. 750,330) can be used. Radical-forming substances, such as, for example redox systems, which expression is to be understood to mean a system containing compounds yielding oxygen and reducing compounds, can be used as activators in the polymerization reaction. Particularly noteworthy is the activation of the novel copolymerization reaction by means of aliphatic sulphinic acid salts having a carbon chain such as soap fatty acids without the addition of compounds yielding oxygen (Makrom, Chemie, vol. III, page 43, 1949). Moreover, it is possible for the thermoplastic behaviour of the copolymers to be influenced in accordance with known processes by the addition of regulating agents. It is obvious that it is necessary for stabilisers to be added prior to the working up process; examples of such stabilisers are phenyl-β-naphthylamine or corresponding phenols.

The novel copolymers are of particular interest when the butadiene monomers are used in amounts of 50% or more (by weight calculated on the total amount of monomers applied). The ester acids are preferably used in quantities amounting to 1–25% and the further polymerizable compounds in quantities amounting to 1–49% by weight calculated on the total amount of monomers applied. The synthetic products built up on this basis can be worked up with particular ease. Furthermore, they are thermoplastic and can be masticated. Moreover, the tackiness and the mouldability of the novel polymers are excellent.

In addition to being vulcanized with sulphur with the addition of accelerators, such as is known with regard to natural and synthetic rubber, the novel copolymers can be vulcanized without the use of sulphur, by means of polyhydric alcohols, such as ethyleneglycol, 1.4-butanediol, 1.6-hexanediol, trimethylolpropane, glycerine pentaerithrol, pyrocatechol, hydroquinone, resorcinol, 1.4-cyclohexanediol, 1.4-dihydroxymethylbenzene, polybasic amines, such as ethylenediamine, propylenediamine, hexaneethylenediamine, diethylenetriamine, triethylenetetramine, tetraethylenepentamine, pentaethylenehexamine, piperazine, 2.6-diaminopyridine, p-phenylenediamine, 1.4-diaminomethylbenzene, 1.4-diaminocyclohexane, and salts of these polybasic amines with weak inorganic and organic acids such as $CO_2$, boron acid, acetic acid, benzoic acid or polyvalent metal oxides, such as oxides of zinc, magnesium, calcium, cadmium, aluminium, barium, tin, iron, lead, antimony. In principle, all compounds which are able to react with cross-linking with the free carboxyl groups of the copolymers are effective. For carrying out the vulcanization the aforementioned compounds are mixed with the copolymers as by milling or mastication in a Banbury mixer and thereafter heated to a temperature of 80–180° C. The time of heating amounts to about 10 minutes to 3 hours. The amount of curing components applied depends on the carboxyl content of the copolymers. It should be at least equivalent to the amount of carboxyl groups and can be 10 times as high as this equivalent amount. For example, when the novel copolymers are vulcanized with ethylene diamine without the addition of sulphur, zinc oxide or accelerators, the vulcanizates produced have higher elasticity values and lower hardness values, while having the same tensile strengths and elongation values as vulcanizates obtained by vulcanization with sulphur. It is obvious that the conventional rubber auxiliaries, such as fillers, plasticizers, elasticizing agents or natural or synthetic resins, can be added during the vulcanization of the novel copolymers.

The following examples further illustrate the invention:

*Example 1*

5500 parts by weight of butadiene, 4000 parts by weight of acrylonitrile and 500 parts by weight of maleic acid mono-dodecyl ester are emulsified in 13,300 parts by weight of a solution of 450 parts by weight of the sodium salt of a paraffin sulphonic acid with 12 to 18 carbon atoms in 13,000 parts by weight of water and 300 parts by weight of sulphuric acid and polymerized at 20° C. while stirring after the addition of 26 parts by weight of diisopropyl xanthogen disulphide and 50 parts by weight of the sodium salt of a paraffin sulphinic acid with 12–18 carbon atoms. 39 additional parts by weight of diisopropyl xanthogen disulphide are added in three portions each of 14 parts by weight, at yields of 18%, 30% and 42%. After 20 hours, a yield of 80% is obtained. The operation is stopped and 3% of a conventional stabilizer such as phenyl-β-naphthylamine, is added. The emulsion is then coagulated with dilute common salt solution. The friable mass which is formed is washed free from emulsifier and dried by circulating air in a drying chamber at 50° C. Upon being cold-rolled, the polymer yields a soft sheet which can be satisfactorily worked and which as a raw sheet has a defo value of 400/9.3. The product is vulcanized with sulphur, using the following mixture at a vulcanization temperature of 138° C. and a vulcanization time of 45 minutes.

100 parts by weight of copolymer,
3 parts by weight of copolymer plasticiser (an oily butadiene polymer (Buna 32)),
2 parts by weight of mineral oil containing paraffin,
2 parts by weight of stearic acid,
5 parts by weight of zinc white RS,
40 parts by weight of active gas carbon,
1.5 parts by weight of sulphur,
0.8 part by weight of benzothiazolyl-2-sulphene diethylamide.

The product is alternatively vulcanized without the use of sulphur by using the following mixture:

100 parts by weight of copolymer,
2 parts by weight of plasticizer (an oily butadiene polymer (Buna 32)),
2 parts by weight of mineral oil containing paraffin,
40 parts by weight of active gas carbon,
3 parts by weight of ethylene diamine.

The test values obtained with the two vulcanization mixtures are compared in the following table:

|  | sulphur vulcanization | sulphur-free vulcanization |
| --- | --- | --- |
| tensile strength, kg./cm.² | 258 | 244 |
| elongation, percent | 445 | 600 |
| rebound elasticity, 20° | 18 | 26 |
| loading at 300% | 166 | 85 |
| hardness (° Shore) | 72 | 66 |
| swelling in benzene, percent | 3.5 | 3.4 |
| Do | 131 | 136 |

Example 2

5500 parts by weight of butadiene, 3500 parts by weight of acrylonitrile and 1000 parts by weight of maleic acid monobutyl ester are emulsified and polymerized as described in Example 1. A yield of 80% is obtained after 35 hours with a polymerization temperature of 15° C. The product is further worked up and vulcanized as described in Example 1. A sheet having very good working properties is obtained, the said sheet forming valuable vulcanizates when treated with the mixtures hereinbefore referred to.

Example 3

754 parts by weight of maleic acid anhydride are placed in a suitable stirrer-type autoclave, 246 parts by weight of methanol are added and the mixture heated until the methanol boils. As soon as dissolution has taken place, the stirrer mechanism is started. The reaction immediately begins and may be followed by a rise in the internal temperature. In order to complete the reaction, stirring is continued for a further half hour. The maleic acid monomethyl ester which is formed is then emulsified as indicated in Example 1 with 5500 parts by weight of butadiene and 3500 parts by weight of acrylonitrile, and the emulsion is polymerized. After 35 hours, a yield of 80% is obtained with a polymerization temperature of 25° C. After working up and vulcanization as described in Example 1, a product the properties of which correspond to those of the vulcanizates described in Examples 1 and 2 is obtained.

Example 4

7000 parts by weight of butadiene, 2500 parts by weight of styrene and 500 parts by weight of maleic acid monododecyl ester are emulsified in 16,550 parts by weight of a solution of 450 parts by weight of the paraffin sulphonate of Example 1 in 16,250 parts by weight of water and 300 parts by weight of sulphuric acid and polymerized with the addition of 26 parts by weight of diisopropyl xanthogen disulphide, as described in Example 1. A yield of 80% is obtained after 20½ hours with a polymerization temperature of 25° C. After working up and vulcanization as described in Example 1, a highly elastic and soft product is obtained.

Example 5

7000 parts by weight of butadiene, 2500 parts by weight of methyl methacrylate and 500 parts by weight of maleic acid monododecyl ester are emulsified and polymerized as in Example 4. A yield of 80% is obtained after 38½ hours with a polymerization temperature of 30° C. After suitable working up and vulcanization, a highly elastic, very soft and sticky product is obtained.

Example 6

The polymerization products of Example 1 are worked up and reacted with various polyamines or salts thereof or with polyols or metal oxides by heating to 138° C. for 45 minutes.

The following mixture is used:

100 parts by weight of copolymer,
3 parts by weight of plasticizer (an oily butadiene polymer (Buna 32)),
2 parts by weight of mineral oil containing paraffin,
40 parts by weight of active gas carbon and varying amounts of polyfunctional crosslinking components.

The test values obtained are compared in the following table:

|  | 5 p.b.w. hexamethylene diamine | 1 p.b.w. triethylene tetramine | 7 p.b.w. ethylene diamine diacetate | 12 p.b.w. ethylene diamine dibenzoate | 10 p.b.w. hexamethylene diamine acetate | 5 p.b.w. 1.4-butylene glycol | 5 p.b.w. trimethylol propane | 5 p.b.w. zinc oxide |
| --- | --- | --- | --- | --- | --- | --- | --- | --- |
| tensile strength, kg./cm.² | 185 | 249 | 178 | 188 | 192 | 133 | 156 | 230 |
| elongation, percent | 485 | 615 | 760 | 625 | 560 | 865 | 900 | 510 |
| rebound elasticity, 20° | 24 | 22 | 22 | 21 | 23 | 28 | 22 | 18 |
| loading at 300% | 76 | 78 | 30 | 52 | 67 | 22 | 22 | 119 |
| hardness (° Shore) | 64 | 63 | 59 | 61 | 60 | 60 | 60 | 74 |
| swelling in benzene, percent | 2.3 | 2.9 | 2.3 | 1.8 | 2.2 | 3.1 | 3.1 | 4.1 |
| Do | 142 | 143 | 161 | 147 | 136 | 200 | 183 | 203 |

What we claim is:
1. A process for the production of a synthetic elastomer which comprises copolymerizing in an aqueous emulsion at a pH value of less than 7, in the presence of a free radical-forming catalyst, (1) at least 50% by weight, based on total monomer, of an aliphatic conjugated diene having 4-6 carbon atoms, (2) 1-25% by weight, based on total monomers, of a monoester of maleic acid with a saturated aliphatic monohydric alcohol having 1-18 carbon atoms, and (3) as the remaining component, a further mono-olefinic organic monomer selected from the group consisting of styrene, acrylonitrile, an ester of acrylic acid and a monohydric saturated alcohol of 1-18 carbon atoms, and an ester of methacrylic acid and a monohydric saturated alcohol of 1-18 carbon atoms.

2. A process for the production of a synthetic elastomer which comprises copolymerizing in an aqueous emulsion at a pH value of less than 7, in the presence of a free radical-forming catalyst, (1) at least 50% by weight, based on total monomer, of an aliphatic conjugated diene having 4-6 carbon atoms, (2) a monoester of maleic acid with a saturated aliphatic monohydric alcohol of 1-18 carbon atoms, the percentage of said monoester being sufficient to provide about 0.8-3.5% by weight of carboxyl groups, based on the weight of the copolymer, and (3) as the remaining component, a further mono-olefinic organic monomer selected from the group consisting of styrene, acrylonitrile, an ester of acrylic acid and a monohydric saturated alcohol of 1-18 carbon atoms, and an ester of methacrylic acid and a monohydric saturated alcohol of 1-18 carbon atoms.

3. A process for the production of a synthetic elastomer which comprises copolymerizing in an aqueous emulsion at a pH value of less than 7 in the presence of a free radical-forming catalyst (1) at least 50% by weight of butadiene, based on total monomers, (2) a half-ester of maleic acid with a monohydric saturated alcohol of 4-18 carbon atoms, the proportions of said half-ester being sufficient to incorporate into the copolymer about 0.8-3.5% by weight of carboxyl groups, based on the weight of the copolymer, and (3) as the remaining monomer, acrylonitrile.

4. A process for the production of a synthetic elastomeric terpolymer which comprises copolymerizing in an aqueous emulsion at a pH value of less than 7 in the presence of a free radical-forming catalyst (1) about 55-70% by weight butadiene, based on total monomer, (2) a half-ester of maleic acid with a monohydric saturated alcohol of 4-18 carbon atoms, the proportions of said half-ester being sufficient to incorporate into the copolymer about 0.8-3.5% by weight of carboxyl groups, based on the weight of the copolymer, and (3) as the remaining monomer, acrylonitrile.

5. A synthetic rubbery terpolymer of (1) at least 50% by weight of an aliphatic conjugated diene having 4-6 carbon atoms, (2) 1-25% by weight, based on total monomers, of a monoester of maleic acid with a monohydric saturated alcohol of 4-18 carbon atoms, and (3) a member selected from the group consisting of styrene, acrylonitrile, an ester of acrylic acid, and a monohydric saturated alcohol of 1-18 carbon atoms, and an ester of methacrylic acid and a monohydric saturated alcohol of 1-18 carbon atoms.

6. A synthetic rubbery terpolymer of (1) at least 50% by weight of an aliphatic conjugated diene having 4-6 carbon atoms, (2) a monoester of maleic acid with a monohydric saturated alcohol of 4-18 carbon atoms, the proportions of said monoester being sufficient to incorporate into the copolymer about 0.8-3.5% by weight of carboxyl groups, based on the weight of the copolymer, and (3) a member selected from the group consisting of styrene, acrylonitrile, an ester of acrylic acid, and a monohydric saturated alcohol of 1-18 carbon atoms, and an ester of methacrylic acid and a monohydric saturated alcohol of 1-18 carbon atoms.

7. A synthetic rubbery terpolymer of (1) about 55-70% by weight of an aliphatic conjugated diene having 4-6 carbon atoms, (2) a monoester of maleic acid with a monohydric saturated alcohol of 4-18 carbon atoms, the proportions of said monoester being sufficient to incorporate into the copolymer about 0.5-0.8% by weight of carboxyl groups, based on the weight of the copolymer, and (3) a member selected from the group consisting of styrene, acrylonitrile, an ester of acrylic acid and a monohydric saturated alcohol of 1-18 carbon atoms, and an ester of methacrylic acid and a monohydric saturated alcohol of 1-18 carbon atoms.

8. A synthetic rubbery terpolymer of (1) about 55-70% by weight of butadiene (2) a monoester of maleic acid with a monohydric saturated alcohol of 4-18 carbon atoms, the proportions of said monoester being sufficient to incorporate into the copolymer about 0.5-0.8% by weight of carboxyl groups, based on the weight of the copolymer, and (3) acrylonitrile.

References Cited in the file of this patent

UNITED STATES PATENTS

| | | |
|---|---|---|
| 2,205,108 | Rosen | June 18, 1940 |
| 2,583,326 | D'Alelio | Jan. 22, 1952 |
| 2,634,256 | Sparks et al. | Apr. 7, 1953 |
| 2,717,247 | Contois | Sept. 6, 1955 |
| 2,724,707 | Brown | Nov. 22, 1955 |

FOREIGN PATENTS

| | | |
|---|---|---|
| 842,186 | France | 1939 |